(12) United States Patent
Fukuchi et al.

(10) Patent No.: US 11,768,114 B2
(45) Date of Patent: Sep. 26, 2023

(54) TEMPERATURE SENSOR, POWER DISTRIBUTION COMPONENT HAVING THE SAME, AND MOTOR HAVING POWER DISTRIBUTION COMPONENT

(71) Applicants: Proterial, Ltd., Tokyo (JP); Hitachi Astemo Electric Motor Systems, Ltd., Ibaraki (JP)

(72) Inventors: Keisuke Fukuchi, Tokyo (JP); Masanori Sagawa, Tokyo (JP); Masashi Yokoi, Ibaraki (JP)

(73) Assignees: Proterial, Ltd., Tokyo (JP); Hitachi Astemo Electric Motor Systems, Ltd., Ibaraki (JP)

( * ) Notice: Subject to any disclaimer, the term of this patent is extended or adjusted under 35 U.S.C. 154(b) by 449 days.

(21) Appl. No.: 17/077,075

(22) Filed: Oct. 22, 2020

(65) Prior Publication Data

US 2021/0123811 A1    Apr. 29, 2021

(30) Foreign Application Priority Data

Oct. 25, 2019  (JP) .................................. 2019-194010

(51) Int. Cl.
| | |
|---|---|
| *G01K 1/08* | (2021.01) |
| *G01K 1/14* | (2021.01) |
| *H02K 11/25* | (2016.01) |
| *H02K 5/22* | (2006.01) |
| *G01K 7/22* | (2006.01) |

(52) U.S. Cl.
CPC .................. *G01K 1/08* (2013.01); *G01K 1/14* (2013.01); *H02K 5/225* (2013.01); *H02K 11/25* (2016.01); *G01K 7/22* (2013.01)

(58) Field of Classification Search
CPC .................................. G01K 1/08; G01K 1/14
USPC ........................................................ 374/208
See application file for complete search history.

(56) References Cited

U.S. PATENT DOCUMENTS

| | | | |
|---|---|---|---|
| 2019/0267871 A1 | 8/2019 | Yoshihara et al. | |
| 2022/0231467 A1* | 7/2022 | Fukuchi | ............... H01R 13/504 |
| 2022/0278592 A1* | 9/2022 | Fukuchi | .................. H02K 5/225 |
| 2022/0319738 A1* | 10/2022 | Fukuchi | .................... H01B 7/40 |

FOREIGN PATENT DOCUMENTS

| | | | | |
|---|---|---|---|---|
| CN | 108988546 B | * | 9/2021 | ....... H01B 13/01209 |
| DE | 102021116111 A1 | * | 12/2022 | |
| JP | 2004340625 A | * | 12/2004 | |
| JP | 6282791 B1 | | 2/2018 | |
| JP | 2020180790 A | * | 11/2020 | |
| JP | 2022123519 A | * | 8/2022 | |
| JP | 2022160067 A | * | 10/2022 | ............... G01K 1/14 |
| WO | 2018131408 A1 | | 7/2018 | |

\* cited by examiner

*Primary Examiner* — Mirellys Jagan
(74) *Attorney, Agent, or Firm* — McCormick, Paulding & Huber PLLC (57) ABSTRACT

A temperature sensor detects temperatures of at least two distribution lines and includes a temperature detection unit and a protection member that covers the temperature detection unit. The protection member is provided with a first abutting surface that has a concave shape corresponding to an outer shape of a first distribution line and is in contact with the first distribution line and a second abutting surface that has a concave shape corresponding to an outer shape of a second distribution line and is in contact with the second distribution line.

12 Claims, 7 Drawing Sheets

TEMPERATURE SENSOR, POWER DISTRIBUTION COMPONENT HAVING THE SAME, AND MOTOR HAVING POWER DISTRIBUTION COMPONENT

CROSS-REFERENCE TO RELATED APPLICATION

The present application claims priority from Japanese Patent Application No. 2019-194010 filed on Oct. 25, 2019, the contents of which are hereby incorporated by reference into this application.

TECHNICAL FIELD OF THE INVENTION

The present invention relates to a temperature sensor, and more particularly to a temperature sensor suitable for measuring a temperature of a distribution line of a power distribution component. The present invention further relates to a motor having a power distribution component.

BACKGROUND OF THE INVENTION

A technology of measuring a surface temperature of a conductor by a temperature sensor directly attached to the conductor has been known. Patent Document 1 (International Publication No. 2018/131408) describes a temperature sensor fixed on a surface of an insulating coating of an output line of a rotating electrical machine by using a sealing material such as resin or a heat shrink tube.

Patent Document 2 (Japanese Patent No. 6282791) describes a temperature sensor including a coil element, a thermal body, and a housing that contains the coil element and the thermal body. The coil element included in the temperature sensor described in Patent Document 2 is electrically connected to a stator coil of a rotating electrical machine and constitutes a part of the stator coil. Further, the thermal body included in the temperature sensor described in Patent Document 2 detects a temperature of the stator coil by detecting a temperature of the coil element constituting a part of the stator coil.

SUMMARY OF THE INVENTION

In the temperature sensor described in Patent Document 1, the sensitivity and the thermal response may vary depending on the attaching position of the temperature sensor to the measurement target, the application amount of the sealing material for fixing the temperature sensor to the measurement target, and the like.

Further, in the temperature sensor described in Patent Document 2, the sensitivity and the thermal response may vary due to the position shift when assembling the coil element and the thermal body to the housing and the like.

An object of the present invention is to provide a temperature sensor whose variations in sensitivity and thermal response are small and a power distribution component having the temperature sensor. Another object of the present invention is to provide a motor including a power distribution component having a temperature sensor whose variations in sensitivity and thermal response are small.

A temperature sensor according to the present invention is a temperature sensor that detects temperatures of at least two distribution lines, and the temperature sensor includes: a temperature detection unit; and a protection member that covers the temperature detection unit. Further, the protection member is provided with a first abutting surface that has a concave shape corresponding to an outer shape of a first distribution line and is in contact with the first distribution line and a second abutting surface that has a concave shape corresponding to an outer shape of a second distribution line and is in contact with the second distribution line.

According to an aspect of the present invention, the first abutting surface is provided on a first surface of the protection member, and the second abutting surface is provided on a second surface of the protection member on a side opposite to the first surface.

According to another aspect of the present invention, when a virtual line that divides the first abutting surface and the second abutting surface into two halves in a width direction in a transverse section of the protection member is defined as a reference line, the temperature detection unit is arranged at a position on either a right side or a left side with respect to the reference line in the transverse section of the protection member.

According to another aspect of the present invention, the temperature sensor further includes a lead wire for taking out signals from the temperature detection unit, a part of the lead wire being covered with the protection member and the other part thereof being led out to an outside of the protection member. Further, a lead-out direction of the lead wire with respect to the protection member is the same as a longitudinal direction of the first abutting surface and the second abutting surface.

According to another aspect of the present invention, the temperature sensor further includes a lead wire for taking out signals from the temperature detection unit, a part of the lead wire being covered with the protection member and the other part thereof being led out to an outside of the protection member. Further, a lead-out direction of the lead wire with respect to the protection member is different from a longitudinal direction of the first abutting surface and the second abutting surface.

According to another aspect of the present invention, the protection member is made up of a first protection member in which the temperature detection unit is embedded and a second protection member that covers the first protection member.

A power distribution component according to the present invention has two or more distribution lines and a temperature sensor that detects temperatures of the distribution lines. The temperature sensor includes: a temperature detection unit; and a protection member that covers the temperature detection unit. Further, the protection member is provided with a first abutting surface that has a concave shape corresponding to an outer shape of a first distribution line and is in contact with the first distribution line and a second abutting surface that has a concave shape corresponding to an outer shape of a second distribution line and is in contact with the second distribution line.

According to an aspect of the present invention, the distribution lines connect windings of a motor and a terminal unit and supply power to the windings.

According to another aspect of the present invention, the two or more distribution lines include two distribution lines constituting a first line pair connected to a U-phase winding of a three-phase motor, other two distribution lines constituting a second line pair connected to a V-phase winding of the three-phase motor, and other two distribution lines constituting a third line pair connected to a W-phase winding of the three-phase motor.

A motor according to the present invention is provided with the power distribution component according to the present invention described above.

According to the present invention, it is possible to realize a temperature sensor whose variations in sensitivity and thermal response are small and a power distribution component having the temperature sensor. Also, according to the present invention, it is possible to realize a motor including a power distribution component having a temperature sensor whose variations in sensitivity and thermal response are small.

DESCRIPTIONS OF THE PREFERRED EMBODIMENTS

First Embodiment

An example of a temperature sensor to which the present invention is applied will be described below in detail with reference to drawings. The temperature sensor according to this embodiment is a temperature sensor for detecting the temperature of a distribution line constituting a power distribution component, and can detect temperatures of at least two distribution lines at the same time.

Figure 1:
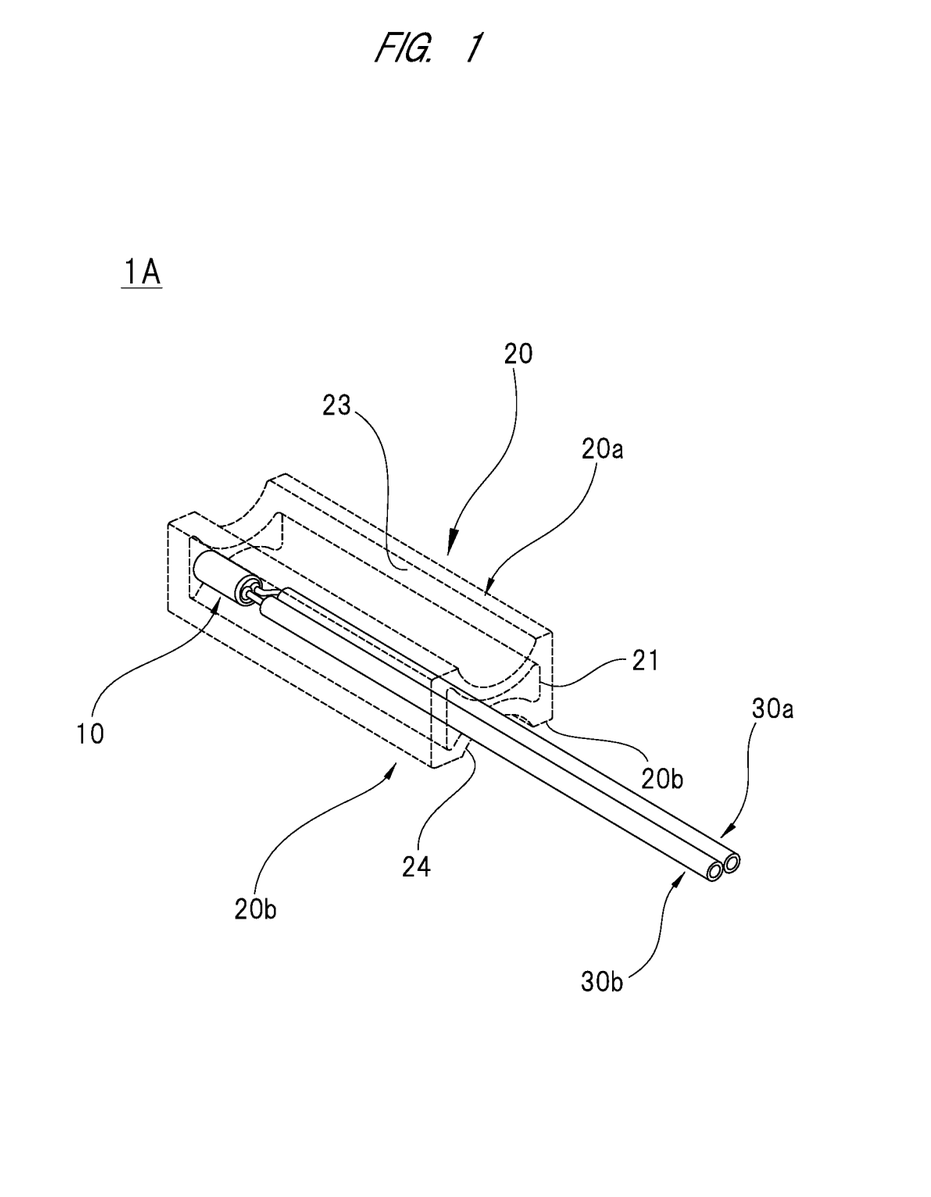
FIG. 1 is a perspective view showing an example of a temperature sensor to which the present invention is applied.

As shown in FIG. 1, a temperature sensor 1A according to this embodiment includes a temperature detection unit 10, a protection member 20, and lead wires 30a and 30b. The temperature detection unit 10 and the lead wires 30a and 30b are covered with the protection member 20. In other words, the protection member 20 is a mold member that contains the temperature detection unit 10 and the lead wires 30a and 30b.

Although the temperature detection unit 10 is entirely covered with the protection member 20, the lead wires 30a and 30b are partially covered with the protection member 20. Specifically, the lead wires 30a and 30b are partially covered in the longitudinal direction with the protection member 20, while the remaining parts of the lead wires 30a and 30b are not covered with the protection member 20 and are led out to an outside of the protection member 20. In the following description, the parts of the lead wires 30a and 30b covered with the protection member 20 are referred to as "embedded portions" and the other parts of the lead wires 30a and 30b not covered with the protection member 20 are referred to as "led-out portions" in some cases for discrimination.

Figure 2:
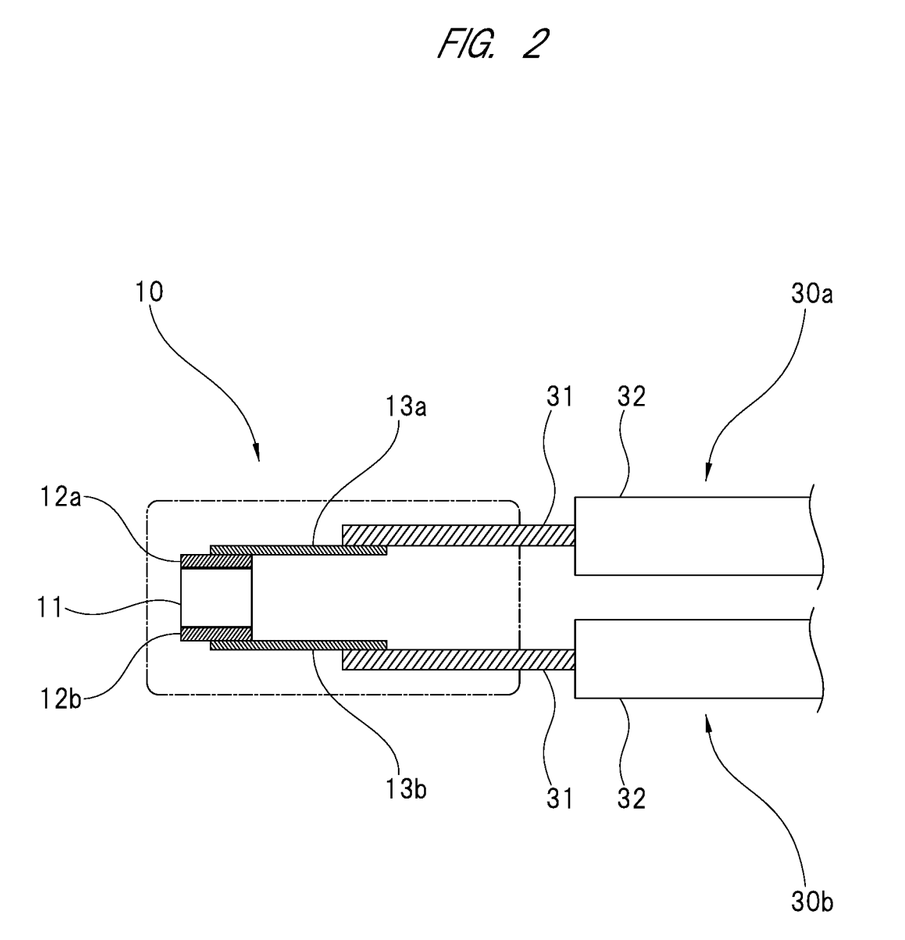
FIG. 2 is an explanatory diagram showing a structure of a temperature detection unit shown in FIG. 1.

As shown in FIG. 2, the temperature detection unit 10 includes a temperature detection element 11 such as a thermistor or a platinum resistor. An element electrode 12a is provided on one surface of the temperature detection element 11, and an electrode wire 13a is welded to the element electrode 12a. Also, an element electrode 12b is provided on the other surface of the temperature detection element 11, and an electrode wire 13b is welded to the element electrode 12b. In the following description, the element electrode 12a is referred to as "upper element electrode 12a", the electrode wire 13a is referred to as "upper electrode wire 13a", and one surface of the temperature detection element 11 on which the upper element electrode 12a is provided is referred to as "upper surface" in some cases. Further, the element electrode 12b is referred to as "lower element electrode 12b", the electrode wire 13b is referred to as "lower electrode wire 13b", and the other surface of the temperature detection element 11 on which the lower element electrode 12b is provided is referred to as "lower surface" in some cases.

Namely, the upper element electrode 12a is provided on the upper surface of the temperature detection element 11, and the upper element electrode 12a is connected to the lead wire 30a through the upper electrode wire 13a. Also, the lower element electrode 12b is provided on the lower surface of the temperature detection element 11, and the lower element electrode 12b is connected to the lead wire 30b through the lower electrode wire 13b.

The lead wires 30a and 30b electrically connected to the temperature detection element 11 are coated lead wires each having a core wire 31 and a coating 32 provided around the core wire 31. Also, a tip of the exposed core wire 31 of the lead wire 30a is soldered to an end of the upper electrode wire 13a, and a tip of the exposed core wire 31 of the lead wire 30b is soldered to an end of the lower electrode wire 13b. Further, the temperature detection element 11, the electrode wires 13a and 13b including contact points (welding points) with the temperature detection element 11, and exposed portions of the core wires 31 of the lead wires 30a and 30b including contact points (soldering points) with the electrode wires 13a and 13b are collectively covered with resin such as epoxy resin, glass, or the like.

Note that the core wires 31 of the lead wires 30a and 30b are stranded wires made of a plurality of annealed copper wires each plated with tin, nickel, or the like. Also, the coatings 32 of the lead wires 30a and 30b are preferably made of fluororesin having excellent heat resistance (for example, polytetrafluoroethylene (PTFE), perfluoroalkoxy fluororesin (PFA), tetrafluoroethylene/hexafluoropropylene copolymer (FEP)).

With reference to FIG. 1 again, the temperature detection unit 10 and parts (embedded portions) of the lead wires 30a and 30b having the structure described above are arranged inside a space 21 provided in the protection member 20. Further, the space 21 of the protection member 20 is filled with a sealing material (FIG. 4), and the temperature detection unit 10 and the embedded portions of the lead wires 30a and 30b are fixed by the sealing material 22 in the space 21. Note that the sealing material 22 (FIG. 4) in this embodiment is epoxy resin, but the sealing material 22 is not limited to epoxy resin.

The protection member 20 shown in FIG. 1 is a resin molded body that is formed by injecting molten resin into a mold. The resin used as the material of the protection member 20 is preferably excellent in heat resistance and oil resistance, and engineering plastic and super engineering plastic such as polyphenylene sulfide (PPS), polyimide (PI), polytetrafluoroethylene (PTFE), and polyamide imide (PAI) are preferred. Among these resin materials, PPS, which is excellent in heat resistance and rigidity and has high fluidity during manufacturing, is particularly preferable as the material of the protection member 20.

Figure 3:
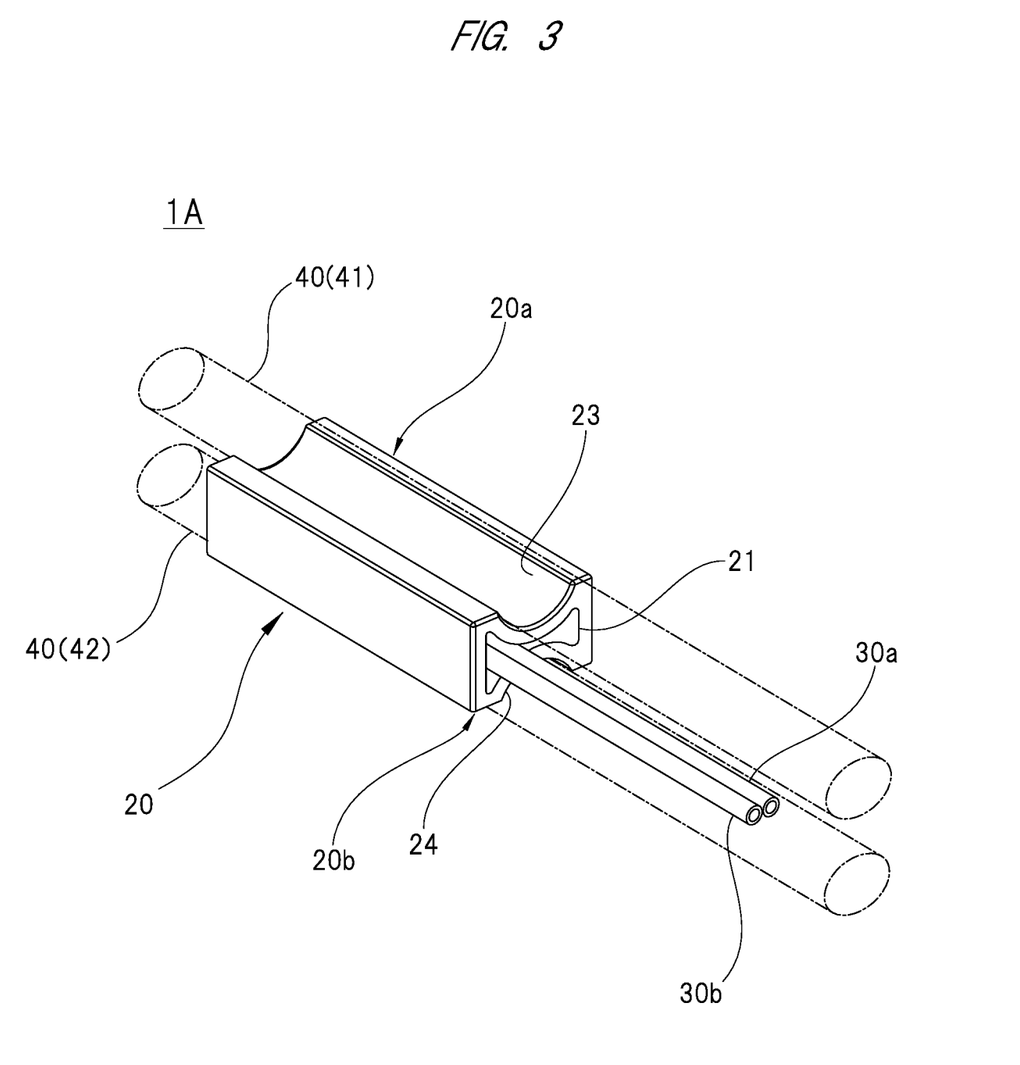
FIG. 3 is a perspective view showing a usage state of the temperature sensor shown in FIG. 1.
Figure 4:
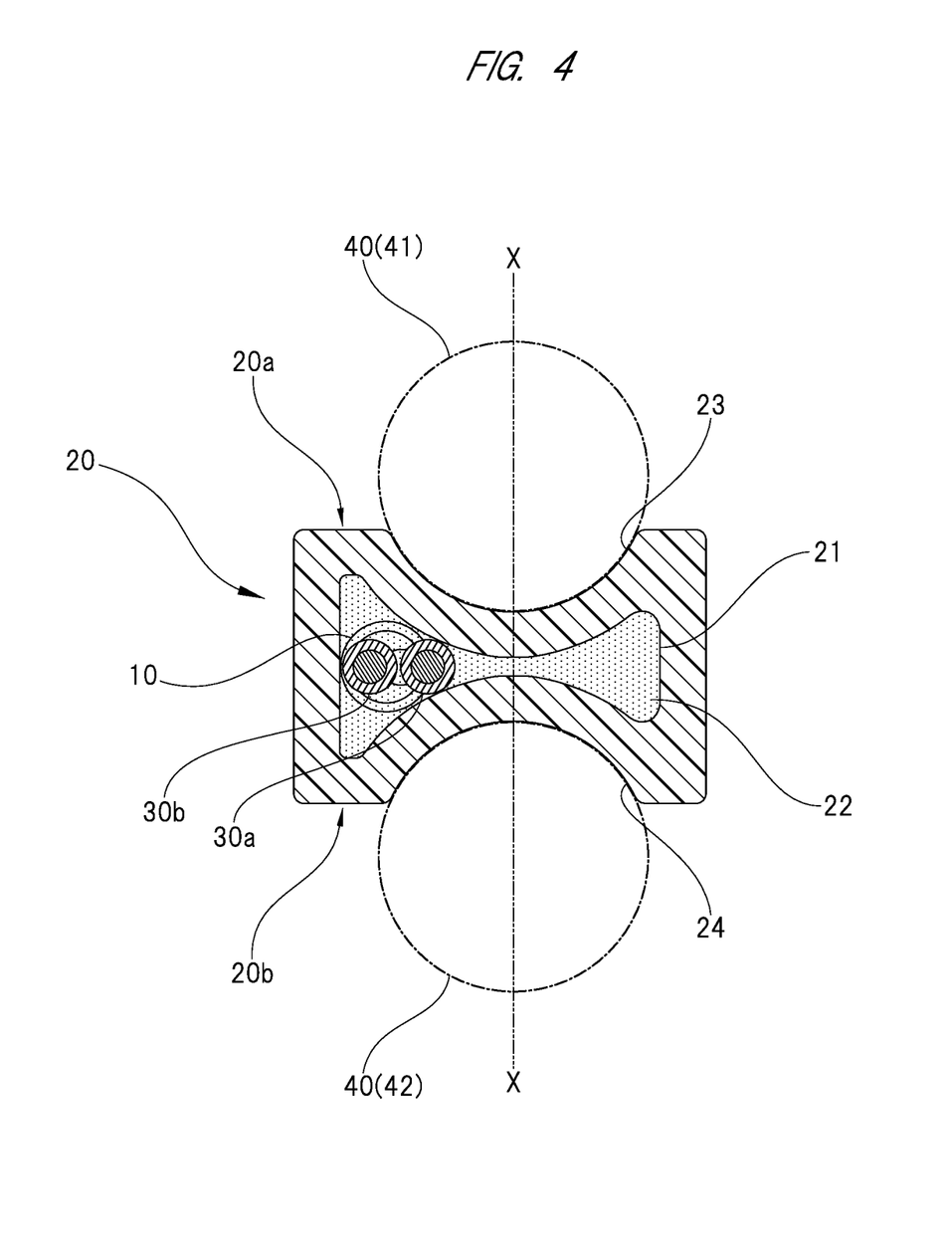
FIG. 4 is a side cross-sectional view of a protection member shown in FIG. 1.

As shown in FIG. 3 and FIG. 4, a first abutting surface 23 is provided on a first surface (upper surface 20a) of the protection member 20, and a second abutting surface 24 is provided on a second surface (lower surface 20b) of the protection member 20 on a side opposite to the first surface. The first abutting surface 23 and the second abutting surface 24 each have a concave shape corresponding to an outer shape of a distribution line 40, and extend along the longitudinal direction of the protection member 20.

As shown in FIG. 4, the first abutting surface 23 is in contact with one of the two distribution lines 40 (first distribution line 41), and the second abutting surface 24 is in contact with the other of the two distribution lines 40 (second distribution line 42). More specifically, the distribution line 40 is an electric wire having a circular outer shape, and each of the first abutting surface 23 and the second abutting surface 24 is a concave surface that follows the outer shape of distribution line 40. Then, the first abutting surface 23 is in surface contact with a part of the outer peripheral surface of the first distribution line 41, and the second abutting surface 24 is in surface contact with a part of the outer peripheral surface of the second distribution line 42. Namely, the first abutting surface 23 and the second abutting surface 24 are curved surfaces each having the same or substantially the same curvature as that of the outer peripheral surface of the distribution line 40.

In other words, the upper surface 20a and the lower surface 20b of the protection member 20 are each provided with a depression into which the distribution line 40 fits. Then, when the distribution line 40 fits into the depression, the entire surface of the depression is in contact with the surface of the distribution line 40.

Note that, as shown in FIG. 3, the lead-out direction of the lead wires 30a and 30b with respect to the protection member 20 is the same as the longitudinal direction of the first abutting surface 23 and the second abutting surface 24.

As shown in FIG. 4, the space 21 in which the temperature detection unit 10 is embedded is provided between the first abutting surface 23 and the second abutting surface 24 in a thickness direction of the protection member 20 (vertical direction in FIG. 4). Therefore, when the first distribution line 41 is in contact with the first abutting surface 23 and the second distribution line 42 is in contact with the second abutting surface 24, the temperature detection unit 10 is located between the first distribution line 41 and the second distribution line 42 in the thickness direction of the protection member 20. Namely, the temperature detection unit 10 is sandwiched between the first distribution line 41 and the second distribution line 42.

Here, the distribution line 40 is a constituent element of a power distribution component that supplies power to an electric device such as a motor, and functions as a power supply line that supplies power to the electric device. When power is supplied to the electric device through the distribution line 40, the distribution line 40 generates heat due to the conductor resistance. Then, the temperature rise due to the heat generation of the distribution line 40 is detected (measured) by the temperature detection unit 10 embedded in the protection member 20, and signals indicating the detection result (measurement result) are taken out through the lead wires 30a and 30b. For example, when the temperature detection element 11 (FIG. 2) provided in the temperature detection unit 10 is a thermistor, the resistance value corresponding to the thermal temperature is taken out as the signals indicating the detection result. The signals taken out from the temperature detection unit 10 are input to a detection section (not shown) through the lead wires 30a and 30b. At this time, an intermediate connection part may be provided by a connector or other connection member on the signal transmission path to the detection section.

As described above, the temperature sensor 1A according to this embodiment includes the protection member 20 in which the temperature detection unit 10 is embedded, and the protection member 20 is provided with the first abutting surface 23 and the second abutting surface 24 with which the two distribution lines 40 are in contact, respectively. Further, the first abutting surface 23 and the second abutting surface 24 provided in the protection member 20 each have the concave shape corresponding to the outer shape of each distribution line 40. Therefore, the temperature sensor 1A according to this embodiment can be assembled to the two distribution lines 40 by just sandwiching the protection member 20 between the two distribution lines 40. Further, it is also possible to adjust the position of the temperature sensor 1A by moving (sliding) the protection member 20 sandwiched between the two distribution lines 40 along the distribution lines 40. In general, the temperature sensor 1A according to this embodiment can be easily positioned and assembled to the distribution lines 40 serving as the measurement target.

Also, since the first abutting surface 23 and the second abutting surface 24 provided on the protection member 20 each have the concave shape corresponding to the outer shape of the distribution line 40, the protection member 20 and the distribution lines 40 are in close contact (surface contact) with each other, and the heat is efficiently transmitted from the distribution lines 40 to the protection member 20. In addition, since the temperature detection unit 10 embedded in the protection member 20 is arranged between the first abutting surface 23 and the second abutting surface 24, the heat is efficiently and evenly transmitted from the protection member 20 to the temperature detection unit 10. As a result, by the temperature sensor 1A according to this embodiment, the temperatures of the two distribution lines 40 can be simultaneously measured at high accuracy.

On the other hand, there is a possibility that the temperature detection unit 10 sandwiched between the two distribution lines 40 (first distribution line 41 and second distribution line 42) is affected by stress and vibration due to the displacement of the first distribution line 41 and the second distribution line 42. In particular, the welding points between the temperature detection element 11 and the electrode wires 13a and 13b and the soldering points between the electrode wires 13a and 13b and the lead wires 30a and 30b are weak against stress and vibration. Further, when the coating that covers the temperature detection element 11, the electrode wires 13a and 13b, and the like is made of glass, the coating may be damaged by stress and vibration.

Thus, as shown in FIG. 4, the positional relationship between the first and second abutting surfaces 23 and 24 and the temperature detection unit 10 is set so that the temperature detection unit 10 is arranged at a position other than directly below the first distribution line 41 and a position other than directly above the second distribution line 42 when the first distribution line 41 is brought into contact with the first abutting surface 23 and the second distribution line 42 is brought into contact with the second abutting surface 24.

More specifically, when a virtual line that divides the first abutting surface 23 and the second abutting surface 24 into two halves in a width direction (vertical direction in FIG. 4) in a transverse section of the protection member 20 is defined as a reference line X, the temperature detection unit 10 is arranged at a position on one side (right side or left side) with respect to the reference line X in the transverse section of the protection member 20. In other words, the temperature detection unit 10 is arranged at a position offset from the reference line X by a predetermined distance in the width direction of the protection member 20 in the transverse section of the protection member 20.

In the temperature sensor 1A according to this embodiment, the positional relationship between the first and second abutting surfaces 23 and 24 and the temperature detection unit 10 is set as described above, and thus the influence on the temperature detection unit 10 by stress and vibration due to the displacement of the first distribution line 41 and the second distribution line 42 is reduced, so that the reliability as the temperature sensor is improved.

Second Embodiment

Another example of a temperature sensor to which the present invention is applied will be described below ion detail with reference to drawings. Understandably, the temperature sensor according to this embodiment is a temperature sensor that has the same basic structure as the temperature sensor 1A (FIG. 1) according to the first embodiment and is used for the same purpose as the temperature sensor 1A (FIG. 1) according to the first embodiment. Therefore, the descriptions for the same or substantially the same configurations as those described above will be omitted as appropriate. In addition, the same reference signs are used for the same or substantially the same configurations as those described above.

Figure 5:
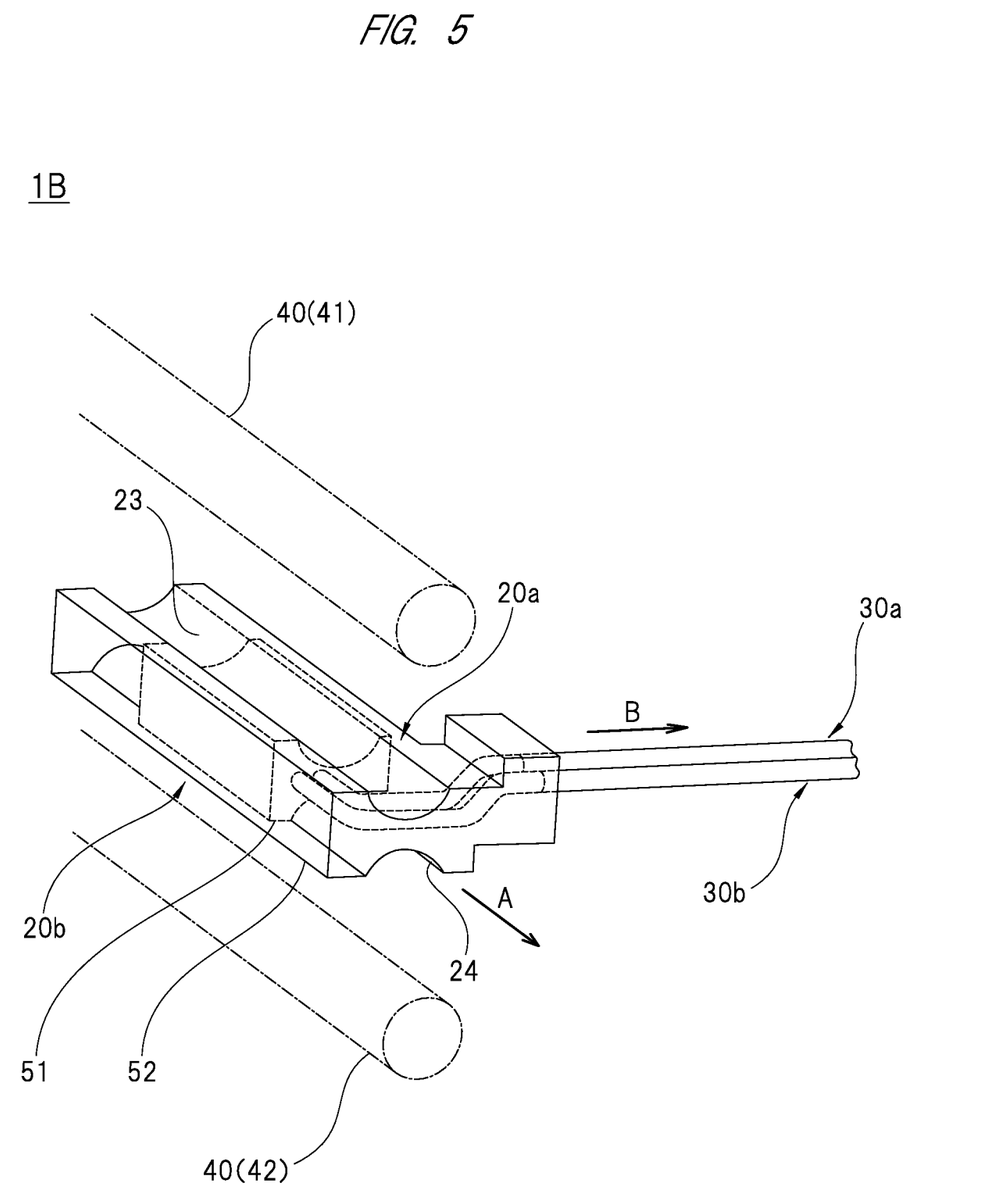
FIG. 5 is a perspective view showing another example of a temperature sensor to which the present invention is applied.

As shown in FIG. 5, the protection member 20 provided in a temperature sensor 1B according to this embodiment is made up of a first protection member 51 and a second protection member 52. The first protection member 51 which is one of the constituent elements of the protection member 20 according to this embodiment has substantially the same shape and structure as those of the protection member 20 according to the first embodiment, and a temperature detection unit which is the same as the temperature detection unit 10 shown in FIG. 1 and FIG. 2 is embedded in the first protection member 51.

Also, the second protection member 52 which is the other of the constituent elements of the protection member 20 according to this embodiment covers the first protection member 51. As a result, in this embodiment, a part of the surface of the second protection member 52 serves as the first abutting surface 23 to be in contact with the first distribution line 41, and another part of the surface of the second protection member 52 serves as the second abutting surface 24 to be in contact with the second distribution line 42.

Understandably, the temperature sensor 1B according to this embodiment is common with the temperature sensor 1A according to the first embodiment in that it has the protection member 20 provided with the first abutting surface 23 and the second abutting surface 24 that have the concave shape corresponding to the outer shape of the distribution line 40 and are in contact with the surfaces of the distribution lines 40. Namely, the temperature sensor 1A according to the first embodiment and the temperature sensor 1B according to this embodiment are common in that they have the configuration in which the protection member 20 including the temperature detection unit 10 and the distribution lines 40 can be in surface contact with each other.

On the other hand, the temperature sensor 1B according to this embodiment is different from the temperature sensor 1A according to the first embodiment in the lead-out direction of the lead wires 30a and 30b with respect to the protection member 20. More specifically, in the temperature sensor 1A according to the first embodiment, the lead-out direction of the lead wires 30a and 30b with respect to the protection member 20 is the same as the longitudinal direction of the first abutting surface 23 and the second abutting surface 24. On the other hand, in the temperature sensor 1B according to this embodiment, the lead-out direction of the lead wires 30a and 30b with respect to the protection member 20 is different from the longitudinal direction of the first abutting surface 23 and the second abutting surface 24. More specifically, as shown in FIG. 5, the lead wires 30a and 30b are led out in the direction (direction of arrow B) orthogonal to the longitudinal direction (direction of arrow A) of the first abutting surface 23 and the second abutting surface 24 with respect to the protection member 20.

However, the lead wires 30a and 30b are led out in the same direction as the longitudinal direction (direction of arrow A) of the first abutting surface 23 and the second abutting surface 24 with respect to the first protection member 51. Namely, the lead wires 30a and 30b led out in the direction of arrow A from the first protection member 51 are bent by about 90 degrees in the second protection member 52 and are led out in the direction of arrow B from the second protection member 52. In other words, a part of the second protection member 52 serves also as a lead wire guiding portion that keeps the bent state of the lead wires 30a and 30b and defines the lead-out direction of the lead wires 30a and 30b with respect to the protection member 20.

Note that the difference in the lead-out direction of the lead wires 30a and 30b between the temperature sensor 1A according to the first embodiment and the temperature sensor 1B according to this embodiment arises from the difference in the scheduled arrangement route of the lead wires 30a and 30b.

Third Embodiment

An example of a power distribution component to which the present invention is applied will be described below in detail with reference to drawings. The power distribution component according to this embodiment includes two or more distribution lines that connect windings of a motor and a terminal unit and supplies power to the winding and a temperature sensor that is arranged between the two distribution lines and detects temperatures of these distribution lines. Also, the temperature sensor provided in the power distribution component according to this embodiment is the temperature sensor 1B (FIG. 5) described as the second embodiment of the present invention.

Figure 6:
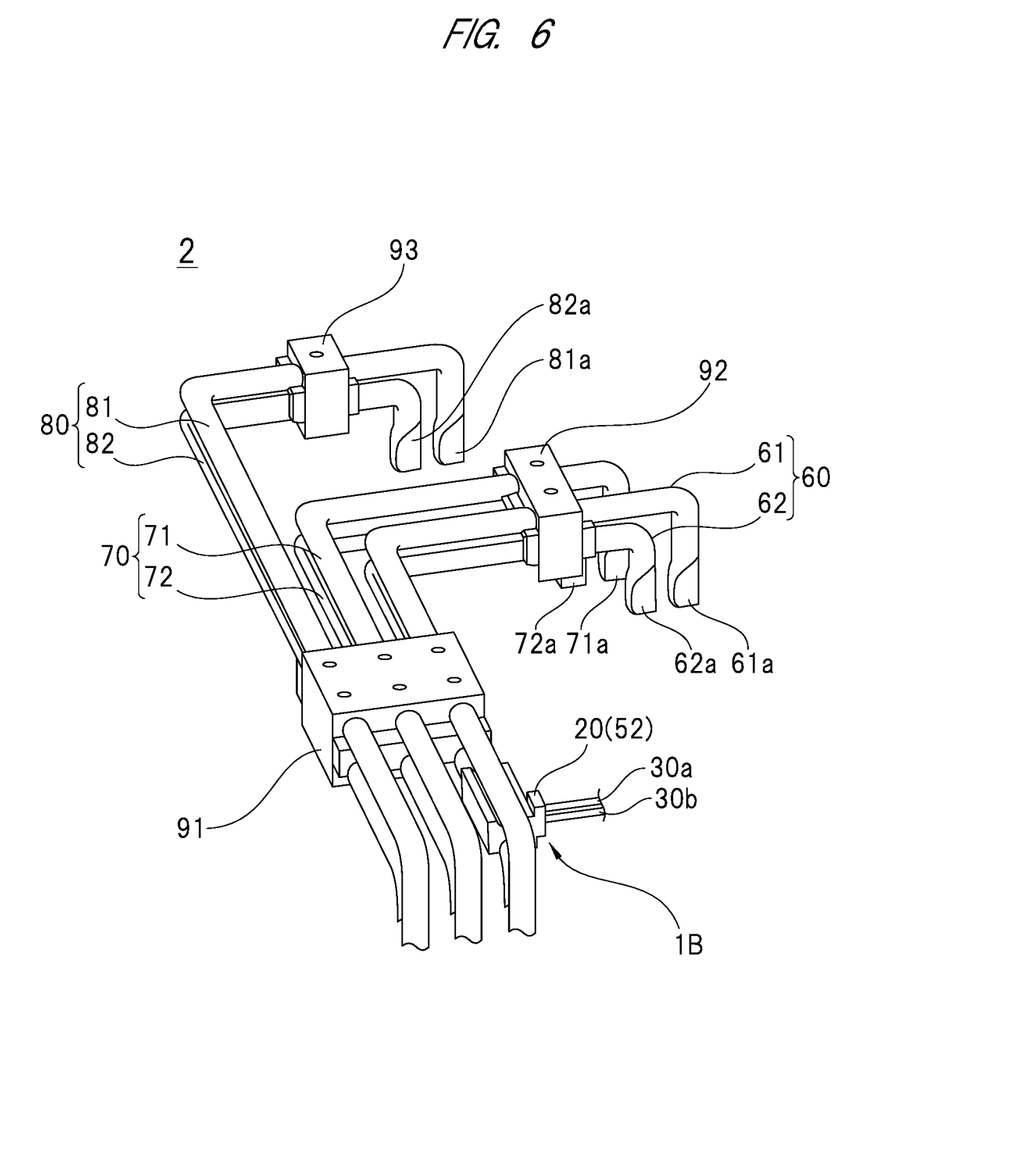
FIG. 6 is a perspective view showing an example of a power distribution component to which the present invention is applied.

As shown in FIG. 6, a power distribution component 2 according to this embodiment includes a pair of distribution lines 61 and 62, another pair of distribution lines 71 and 72, and still another pair of distribution lines 81 and 82. Namely, the power distribution component 2 according to this embodiment includes three pairs of distribution lines (six distribution lines) in total. In the following description, the pair of distribution lines 61 and 62 is referred to as "first line pair 60", another pair of distribution lines 71 and 72 is referred to as "second line pair 70", and still another pair of distribution lines 81 and 82 is referred to as "third line pair 80" in some cases. Note that each of the distribution lines 61, 62, 71, 72, 81, and 82 is an insulated wire having enamel coating provided around a conductive wire and has a circular outer shape.

The power distribution component 2 includes a first fixing member 91 that integrally fixes the first line pair 60, the second line pair 70, and the third line pair 80 and a second fixing member 92 that integrally fixes the first line pair 60 and the second line pair 70. In addition, the power distribution component 2 includes a third fixing member 93 that integrally fixes the distribution line 81 and the distribution line 82 constituting the third line pair 80.

Figure 7:
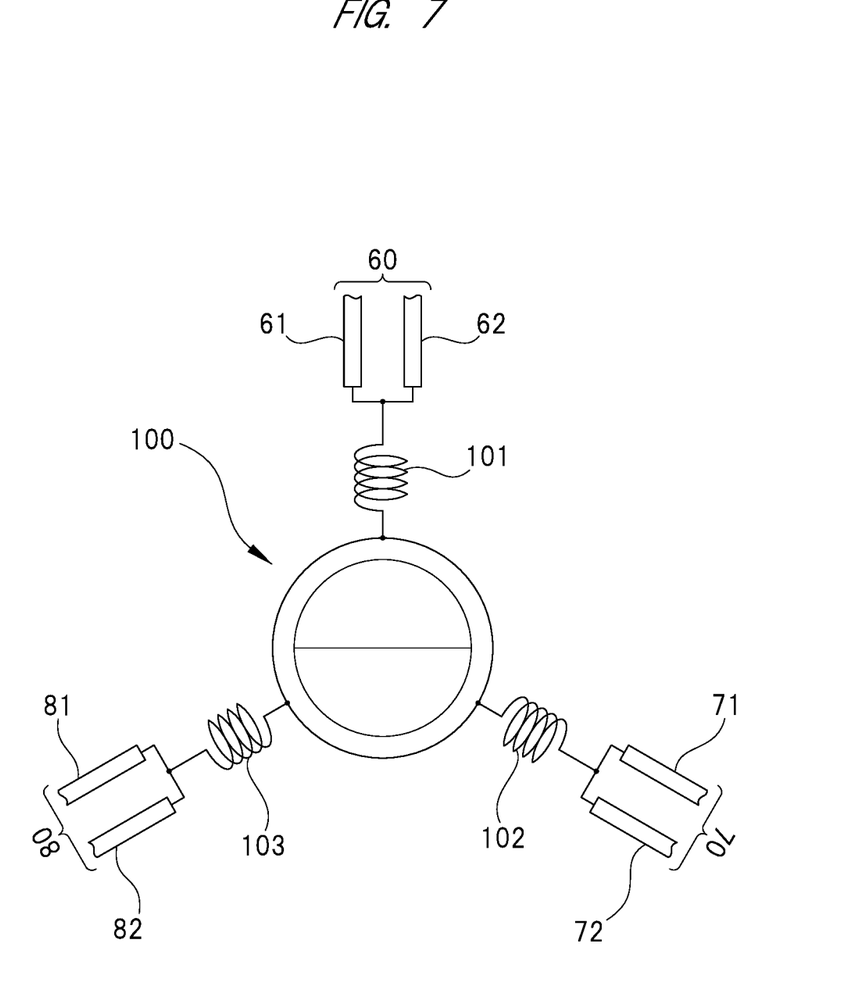
FIG. 7 is a conceptual diagram schematically showing a connection destination of each distribution line.

One end of each of the distribution lines 61, 62, 71, 72, 81, and 82 provided in the power distribution component 2 is connected to a predetermined winding of a three-phase motor. More specifically, as shown in FIG. 7, one ends of the distribution lines 61 and 62 are connected to a U-phase winding 101 of a three-phase motor 100, one ends of the distribution lines 71 and 72 are connected to a V-phase winding 102 of the three-phase motor 100, and one ends of the distribution lines 81 and 82 are connected to a W-phase winding 103 of the three-phase motor 100. Note that FIG. 7 is not a diagram showing the actual wire connection state, but is a conceptual diagram schematically showing the connection destination of each of the distribution lines 61, 62, 71, 72, 81, and 82.

With reference to FIG. 6 again, at the end of each of the distribution lines 61, 62, 71, 72, 81, and 82, a connection end connected to a connection target is provided. More specifically, at one ends of the distribution lines 61 and 62, connection ends 61a and 62a connected to the U-phase winding 101 (FIG. 7) of the three-phase motor 100 are provided, and at the other ends of the distribution lines 61 and 62, connection ends (not shown) connected to predetermined terminals of the terminal unit are provided. At one ends of the distribution lines 71 and 72, connection ends 71a and 72a connected to the V-phase winding 102 (FIG. 7) of the three-phase motor 100 are provided, and at the other ends of the distribution lines 71 and 72, connection ends (not shown) connected to predetermined terminals of the terminal unit are provided. Also, at one ends of the distribution lines 81 and 82, connection ends 81a and 82a connected to the W-phase winding 103 (FIG. 7) of the three-phase motor 100 are provided, and at the other ends of the distribution lines 81 and 82, connection ends (not shown) connected to predetermined terminals of the terminal unit are provided.

In this embodiment, the temperature sensor 1B is provided on the first line pair 60. More specifically, the protection member 20 of the temperature sensor 1B is arranged between the two distribution lines 61 and 62 constituting the first line pair 60. Namely, the distribution lines 61 and 62 shown in FIG. 6 correspond to the distribution lines 41 and 42 shown in FIG. 5.

Understandably, when the temperature sensor 1B is provided on the first line pair 60, the position and number thereof are not limited to those shown in the drawing. For example, the temperature sensor 1B may be arranged in a region between the first fixing member 91 and the second fixing member 92. Also, the temperature sensor 1B may be arranged at each of two or more different positions on the first line pair 60. Of course, the temperature sensor 1B may be provided on the second line pair 70 or the third line pair 80. Further, the temperature sensor 1B may be provided between two line pairs. For example, the temperature sensor 1B may be arranged between the distribution line 61 or the distribution line 62 included in the first line pair 60 and the distribution line 81 or the distribution line 82 included in the third line pair 80.

It is possible to substitute the temperature sensor 1B shown in FIG. 6 with the temperature sensor 1A shown in FIG. 1. Further, it is also possible to use the temperature sensor 1A (FIG. 1) and the temperature sensor 1B (FIG. 5) together.

The present invention is not limited to the embodiments described above, and various modifications can be made within the range not departing from the gist of the invention. For example, the first abutting surface 23 and the second abutting surface 24 in the embodiments described above are concave surfaces (curved surfaces). However, the first abutting surface 23 and the second abutting surface 24 can be changed to another concave shape in accordance with the outer shape of the distribution line 40. For example, when the outer shape of the distribution line 40 is a rectangular shape, the first abutting surface 23 and the second abutting surface 24 can be changed to a concave shape corresponding to the outer shape (rectangular shape) of the distribution line 40.

Any of the space 21 provided in the protection member 20 can be applied if it has the shape and size capable of sufficiently containing the temperature detection unit 10 and the other necessary members. Namely, the shape and size of the space 21 are not limited to those shown in the drawings. For example, the space 21 shown in FIG. 4 extends to the right and left of the reference line X shown in FIG. 4, but the part on the right side of the reference line X may be omitted.

Understandably, it is also possible to form the protection member 20 in which the temperature detection unit 10 and the like are inserted by injecting a resin material into a mold in which the temperature detection unit 10 and the other necessary members are arranged. In this case, the space 21 and the sealing material 22 shown in FIG. 4 are unnecessary.

The core wires 31 of the lead wires 30a and 30b can be changed to stranded wires using conductive wires other than annealed copper wires as element wires. Also, the insulating coating of the distribution lines 61, 62, 71, 72, 81, and 82 can be formed of an insulating material other than enamel.

In this specification, the power distribution component that connects windings of a motor and a terminal unit has been described as an example of the power distribution component according to the present invention. Examples of the motor to which the power distribution component to which the present invention is applied is incorporated include a motor used as a driving source of a vehicle such as an automobile. Understandably, the power distribution component according to the present invention is not limited to the power distribution component that connects windings of a motor and a terminal unit.

What is claimed is:

1. A temperature sensor that detects temperatures of at least two distribution lines, the temperature sensor comprising:
    a temperature detection unit; and
    a protection member that covers the temperature detection unit,
    wherein the protection member is provided with a first abutting surface that has a concave shape corresponding to an outer shape of a first distribution line and is in contact with the first distribution line and a second abutting surface that has a concave shape corresponding to an outer shape of a second distribution line and is in contact with the second distribution line,
    wherein the first abutting surface is provided on a first surface of the protection member,
    wherein the second abutting surface is provided on a second surface of the protection member on a side opposite to the first surface, and
    wherein, when a virtual line that divides the first abutting surface and the second abutting surface into two halves in a width direction in a transverse section of the protection member is defined as a reference line, the temperature detection unit is arranged at a position offset from the reference line by a predetermined distance in the width direction of the protection member.

2. The temperature sensor according to claim 1, wherein the protection member is made up of a first protection member in which the temperature detection unit is embedded and a second protection member that covers the first protection member.

3. The temperature sensor according to claim 1, further comprising a lead wire for taking out signals from the temperature detection unit, a part of the lead wire being covered with the protection member and another part thereof being led out to an outside of the protection member,
wherein a lead-out direction of the lead wire with respect to the protection member is the same as a longitudinal direction of the first abutting surface and the second abutting surface.

4. The temperature sensor according to claim 1, further comprising a lead wire for taking out signals from the temperature detection unit, a part of the lead wire being covered with the protection member and another part thereof being led out to an outside of the protection member,
wherein a lead-out direction of the lead wire with respect to the protection member is different from a longitudinal direction of the first abutting surface and the second abutting surface.

5. A temperature sensor that detects temperatures of at least two distribution lines, the temperature sensor comprising:
a temperature detection unit;
a protection member that covers the temperature detection unit; and
a lead wire for taking out signals from the temperature detection unit, a part of the lead wire being covered with the protection member and another part thereof being led out to an outside of the protection member,
wherein the protection member is provided with a first abutting surface that has a concave shape corresponding to an outer shape of a first distribution line and is in contact with the first distribution line and a second abutting surface that has a concave shape corresponding to an outer shape of a second distribution line and is in contact with the second distribution line, and
wherein a lead-out direction of the lead wire with respect to the protection member is the same as a longitudinal direction of the first abutting surface and the second abutting surface.

6. The temperature sensor according to claim 5, wherein the protection member is made up of a first protection member in which the temperature detection unit is embedded and a second protection member that covers the first protection member.

7. A temperature sensor that detects temperatures of at least two distribution lines, the temperature sensor comprising:
a temperature detection unit;
a protection member that covers the temperature detection unit; and
a lead wire for taking out signals from the temperature detection unit, a part of the lead wire being covered with the protection member and another part thereof being led out to an outside of the protection member,
wherein the protection member is provided with a first abutting surface that has a concave shape corresponding to an outer shape of a first distribution line and is in contact with the first distribution line and a second abutting surface that has a concave shape corresponding to an outer shape of a second distribution line and is in contact with the second distribution line, and
wherein a lead-out direction of the lead wire with respect to the protection member is different from a longitudinal direction of the first abutting surface and the second abutting surface.

8. The temperature sensor according to claim 7, wherein the protection member is made up of a first protection member in which the temperature detection unit is embedded and a second protection member that covers the first protection member.

9. A power distribution component having two or more distribution lines and a temperature sensor that detects temperatures of the distribution lines, the temperature sensor comprising:
a temperature detection unit; and
a protection member that covers the temperature detection unit,
wherein the protection member is provided with a first abutting surface that has a concave shape corresponding to an outer shape of a first distribution line and is in contact with the first distribution line and a second abutting surface that has a concave shape corresponding to an outer shape of a second distribution line and is in contact with the second distribution line.

10. A motor provided with the power distribution component according to claim 9.

11. The power distribution component according to claim 9,
wherein the distribution lines connect windings of a motor and a terminal unit and supply power to the windings.

12. The power distribution component according to claim 11,
wherein the two or more distribution lines include two distribution lines constituting a first line pair connected to a U-phase winding of a three-phase motor, other two distribution lines constituting a second line pair connected to a V-phase winding of the three-phase motor, and other two distribution lines constituting a third line pair connected to a W-phase winding of the three-phase motor.

* * * * *